No. 688,360. Patented Dec. 10, 1901.
J. B. STONE.
ROPE CLAMP.
(Application filed Aug. 3, 1900.)
(No Model.)
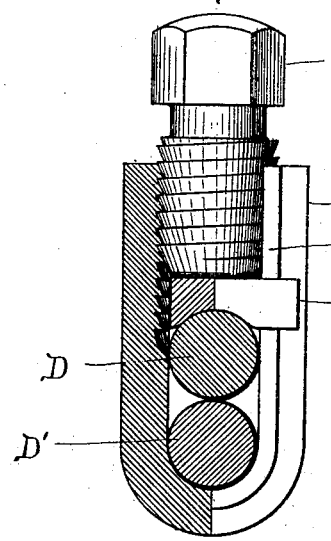
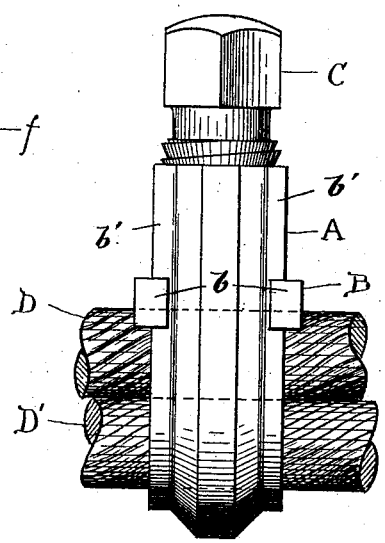
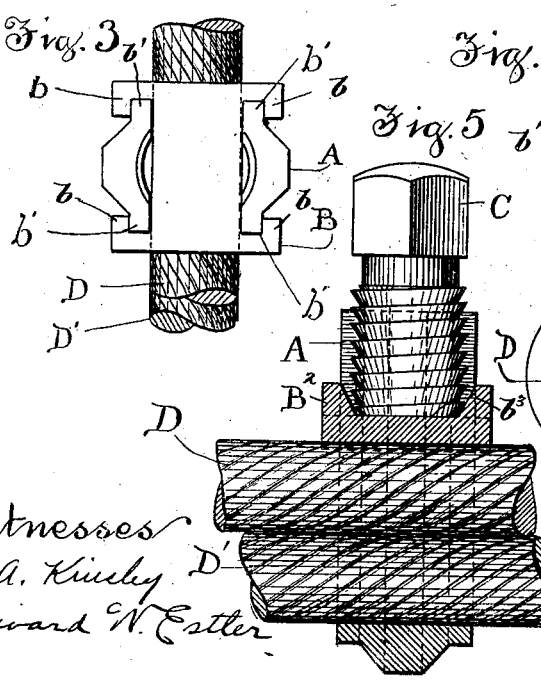
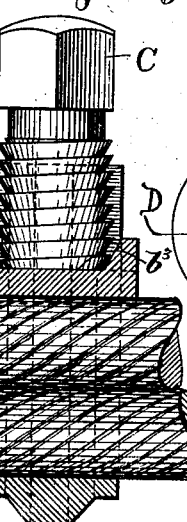
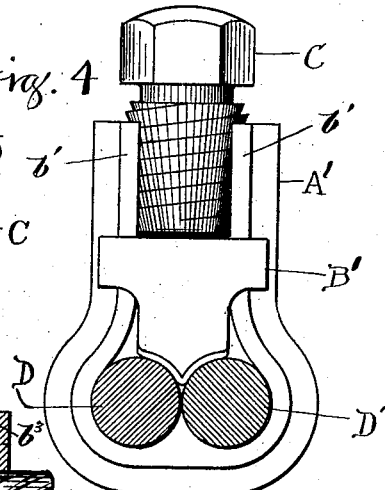
Witnesses
S. A. Kinley
Edward N. Estler
Inventor
James B. Stone

UNITED STATES PATENT OFFICE.

JAMES B. STONE, OF WORCESTER, MASSACHUSETTS.

ROPE-CLAMP.

SPECIFICATION forming part of Letters Patent No. 688,360, dated December 10, 1901.

Application filed August 3, 1900. Serial No. 25,741. (No model.)

*To all whom it may concern:*

Be it known that I, JAMES B. STONE, a citizen of the United States, residing in the city and county of Worcester, State of Massachusetts, have invented a new and useful Improvement in Rope-Clamps, of which the following is a full and complete description.

My invention relates to rope-clamps, and particularly to clamps for fastening two or more ropes together; and it has for its object to provide a clamp which is simple and compact in construction, easy of operation, capable of exerting a powerful clamping action on the ropes in connection with which it is used, and which may be used with ropes of wire, hemp, or other material without danger of injury to the same even when its maximum clamping power is exerted.

The clamp which I have devised and which I will describe in detail hereinafter in connection with the drawings which accompany and form a part of this specification comprises as its essential features a substantially U-shaped yoke, in which the ropes to be clamped are seated, either in vertical or horizontal juxtaposition, a clamping bar or plate movable in said yoke and bearing upon the ropes, and a clamping-screw, so mounted in said yoke as to be readily moved up and down therein, said screw bearing against said clamping-plate and being adapted to force the same down upon the ropes and so clamp them in the eye of the yoke.

In the drawings, Figure 1 is an end view, partly in section, of a clamp embodying my invention with ropes shown in cross-section. Fig. 2 is a side view of the same. Fig. 3 is a top view of the clamp with the screw removed. Fig. 4 is an end view of the clamp with the ropes in horizontal relation to each other; and Fig. 5 is a central sectional view of a clamp, showing a slightly-different form of clamping-plate from that shown in the other views.

Referring to the drawings by reference-letters, A designates the yoke or rope-receiving member of the clamp, and which, as shown, is preferably substantially U-shaped and has at its lower end a suitable seat to receive the rope or ropes D D'. Sliding freely between the arms of said yoke A is the clamping bar or plate B, said bar or plate having its under side shaped to conform to the surface or surfaces of the rope or ropes against which it is to bear. In order to maintain said plate B in position in the yoke A and to guide the same in its movements, as well as to obviate all danger of lateral distortion or spreading of the arms of the U-shaped yoke A under severe clamping strain, the ends of the said plate B are preferably formed with offset lips or lugs $b$, which overlap ribs $b'$, formed on the edges of the yoke A, so that not only is the plate B guided and maintained in position against endwise or lateral displacement in the yoke, but it also prevents spreading of the arms of the yoke A under heavy pressure, as will be clear from Figs. 2 and 3.

The upper parts of the arms of the U-shaped yoke A are threaded on their inner faces to receive a threaded screw C, which is provided with a polygonal head for the reception of a wrench. The said screw C is preferably of the ratchet-thread type, with the square shoulders toward the open end of the yoke, as this form of screw is less apt to spread the yoke than a screw-thread of other form would, and with this ratchet-screw the yoke is of course correspondingly threaded.

In Fig. 4 the ropes to be clamped are shown in horizontal relation, the seat portion of the yoke A' being somewhat enlarged and provided with a plurality of rope-seats and the clamping-plate B' having a double-curved under side to bear upon the ropes, the other details of construction being identical with the form shown in the other figures.

In Fig. 5 I have shown a form of clamping-plate which is intended to lengthen the hold of the screw without lengthening the yoke, the plate $B^2$ in this construction being recessed or cut away on its upper face for the reception of the upper end of the screw.

It will be apparent that while I have shown but one clamping-screw C the clamp may be readily adapted for the use of two or more such screws by lengthening the plate B and brodening the yoke A.

Ropes might be held in the yoke directly by the screw without the clamping-plate; but in such case the clamp would tend to injure the ropes.

It will be obvious that my open-ended or U-shaped yoke, the inner faces of the arms of which are threaded for the engagement therewith of the clamping-screw, may be applied sidewise to the ropes to be clamped at any portions of their lengths when the screw and clamping-plate are removed without requiring the ropes to be entered endwise into the clamp, which is sometimes very inconvenient with long ropes.

It will be understood that while I have described and illustrated the most desirable forms of my invention at present known to me, I do not limit myself to the exact details of construction set forth except so far as the same may be limited by the terms of the appended claims.

I claim—

1. A rope-clamp comprising an open-ended U-shaped rope-holding yoke having its arms internally screw-threaded, and a clamping-screw movable endwise between said arms.

2. A rope-clamp comprising an open-ended U-shaped yoke having its arms internally screw-threaded; a movable clamping-plate mounted in said yoke, and a clamping-screw between said threaded arms and adapted to bear against said clamping-plate.

3. In a rope-clamp, the combination with an open-ended yoke having internally-threaded arms, of a clamping-plate mounted in said yoke and vertically movable therein, said plate being provided with lips or lugs having overlapping engagement with portions of the arms of said yoke, to prevent spreading of said arms, and a clamping-screw between the arms of said yoke and adapted to bear upon said clamping-plate.

4. In a rope-clamp, the combination with an open-ended U-shaped yoke having internally-threaded arms the edges of which are provided with ribs, of a clamping-plate vertically movable between said arms, said plate having offset lips or lugs at its ends to engage the ribs on said arms, whereby endwise displacement of the said clamping-plate and lateral distortion or spreading of the said arms are prevented, and a clamping-screw threaded between said arms and adapted to bear upon said clamping-plate.

5. In a rope-clamp, the combination with an open-ended yoke to receive the ropes, of a clamping-plate having a recessed upper surface, and a clamping-screw threaded between the arms of said yoke and adapted to bear upon the said recessed surface of said clamping-plate.

6. In a rope-clamp, the combination with an open-ended or U-shaped yoke having ratchet-threads formed on the inner sides of its arms, of a clamping-plate mounted in said yoke and freely movable therein, and a ratchet-thread clamping-screw between said arms and adapted to bear upon said clamping-plate.

JAMES B. STONE.

Witnesses:
EDWARD W. ESTLER,
WM. A. WEST.